United States Patent
Kubina et al.

(10) Patent No.: US 6,761,295 B2
(45) Date of Patent: Jul. 13, 2004

(54) ROOFRACK CROSSRAIL ASSEMBLY CAP

(75) Inventors: Joseph E Kubina, Oxford, MI (US); John E Klinkman, Chesterfield Township, MI (US); Robert J Ciarelli, Auburn Hills, MI (US); Lance R Wagner, Lake Orion, MI (US); Abie Azadbakht, Rochester Hills, MI (US); Randall B Flowerday, Milford, MI (US); Jeffrey S Bordner, Oxford, MI (US)

(73) Assignees: DaimlerChrysler Corporation, Auburn Hills, MI (US); Sportrack L.L.C., Sterling Heights, MI (US)

(*) Notice: Subject to any disclaimer, the term of this patent is extended or adjusted under 35 U.S.C. 154(b) by 99 days.

(21) Appl. No.: 10/183,256

(22) Filed: Jun. 25, 2002

(65) Prior Publication Data
US 2003/0234268 A1 Dec. 25, 2003

(51) Int. Cl.[7] ............................................. B62D 25/00
(52) U.S. Cl. ..................... 224/309; 224/316; 296/180.1
(58) Field of Search .................................. 224/316, 309, 224/319; 296/180.1; 150/154

(56) References Cited

U.S. PATENT DOCUMENTS

| | | | |
|---|---|---|---|
| 4,308,983 A | 1/1982 | Yoshida | |
| 4,501,385 A | 2/1985 | Bott | |
| 4,588,117 A | 5/1986 | Bott | |
| 4,972,983 A | 11/1990 | Bott | |
| 5,207,365 A | 5/1993 | Bott | |
| 5,273,195 A | 12/1993 | Cucheran | |
| 5,282,560 A | 2/1994 | Ozog | |
| 5,294,033 A | 3/1994 | Duemmler | |
| 5,470,003 A | 11/1995 | Cucheran | |
| 5,474,218 A | * 12/1995 | Arsenault et al. | 224/316 |
| 5,845,827 A | * 12/1998 | Reising | 224/316 |
| 5,909,782 A | * 6/1999 | Pluff et al. | 180/309 |
| 6,176,404 B1 | 1/2001 | Fourel | |
| 2003/0026008 A1 | * 2/2003 | Tanaka | 359/838 |

FOREIGN PATENT DOCUMENTS

| | | | |
|---|---|---|---|
| DE | 2846344 | * | 5/1980 |
| DE | 4035729 | * | 5/1992 |
| DE | 4039484 | * | 6/1992 |
| DE | 4113230 | * | 10/1992 |
| GB | 2048802 | | 4/1980 |
| JP | 2001-63479 | | 8/1999 |
| WO | WO 99/54168 | * | 10/1999 |

* cited by examiner

*Primary Examiner*—Nathan J. Newhouse
(74) *Attorney, Agent, or Firm*—Edwin W. Bacon, Jr.

(57) ABSTRACT

A removable noise-reducing cover for a luggage rack bar, where the cover has an elongated main body portion having a lower surface and an upper surface with at least one integral noise reducer. The main body portion is arranged to be removable and reattachable to the luggage rack bar.

12 Claims, 1 Drawing Sheet

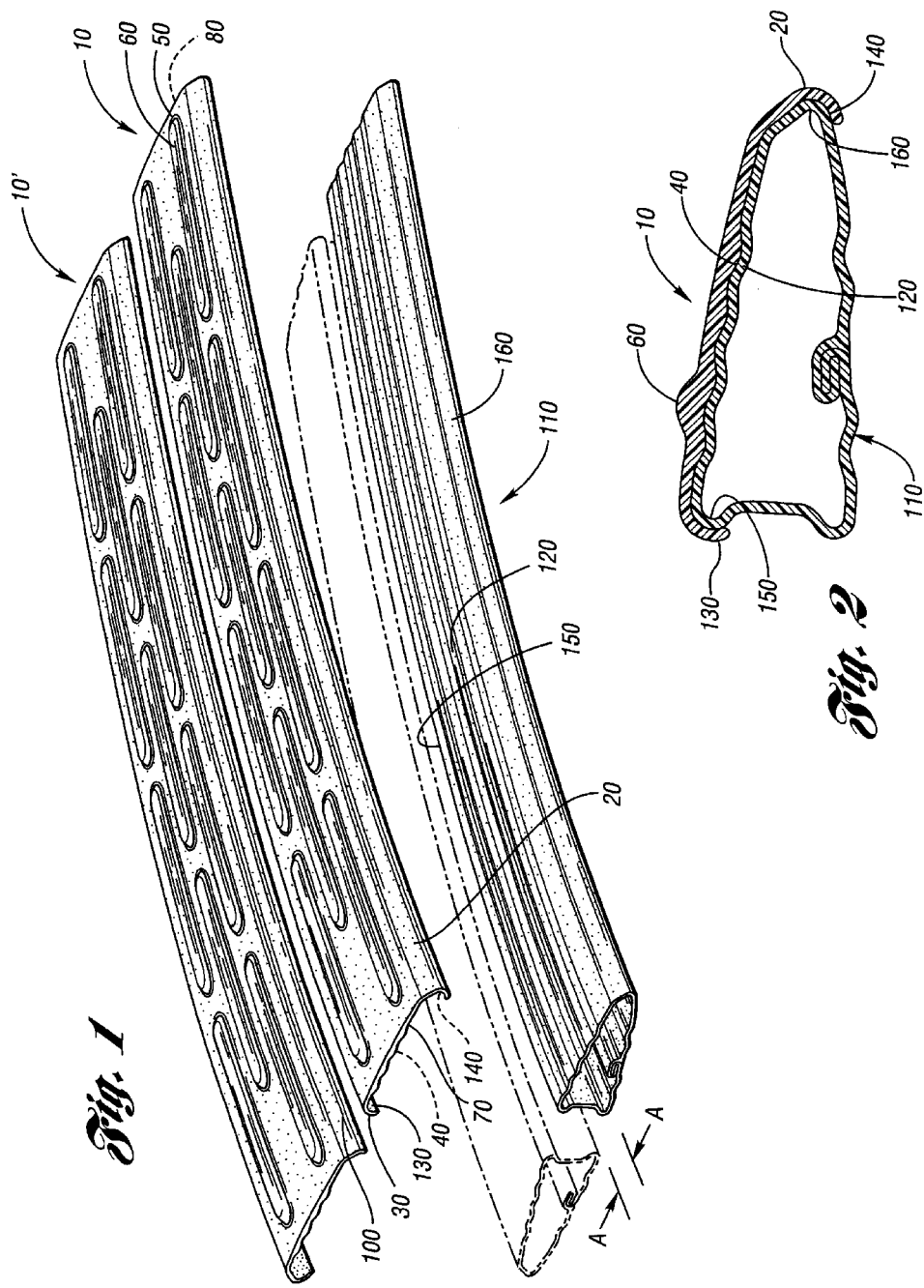

ROOFRACK CROSSRAIL ASSEMBLY CAP

FIELD OF THE INVENTION

This invention relates generally to vehicle luggage racks. More particularly, this invention relates to removable devices for reducing wind noise from vehicle luggage racks.

BACKGROUND OF THE INVENTION

Many vehicles are equipped with a luggage rack to facilitate the carrying of luggage on the outside of the vehicle. The luggage rack is usually located on the roof or trunk of the vehicle where it is exposed to high wind speeds as the vehicle travels along the road.

Generally, the design of the luggage rack comprises two load-carrying bars in a parallel and spaced relationship to each other with both bars situated normal to the longitudinal axis of the vehicle. Each bar is typically supported at each end by a stanchion, and each stanchion is made fast to the vehicle. It is also common for such luggage racks to be adjustable, where adjustment is achieved by moving both stanchions of a bar fore or aft on the vehicle. In this way the roof rack is adjusted as the distance is changed between the bars.

The load-carrying bars may present noise problems when the vehicle is travelling at a high speed. One possible problem is that air whistles as it moves past the bar. Another possible problem is that the bars vibrate as they move through the air. Both of these problems cause undesirable sounds such as whistling or howling in the passenger compartment of the vehicle.

When confronted with the undesirable sounds, the occupants may desire to remove the luggage rack from the vehicle, particularly if the luggage rack is not being used to carry luggage. On some vehicles, however, the luggage rack is either permanently attached or inconvenient to remove. It is also possible that the luggage rack is frequency used and it would be inconvenient to repeatedly and frequently install and remove the rack. In these situations, it is desirous to have an apparatus capable of reducing or eliminating the noise while the luggage rack is attached to the vehicle. To this end, there are known devices that attach to the bars to disturb the airflow as it moves across the bar. One such device is an adhesive strip that has an irregular surface exposed to the airflow. The adhesive strip is attached lengthwise to the bar so the exposed irregular surface disturbs the airflow. Another type of device slides lengthwise into a channel formed into the bar. This device, like the adhesive strip, has an exposed irregular surface that disturbs airflow in an attempt to reduce or eliminate the undesirable noise.

While these known devices appear to be capable of reducing noise, they also present new problems. The first problem is that the known devices are, for all practical purposes, permanent once installed. In addition, once installed the devices may interfere with the capability of the rack to carry luggage. For example, many carrying accessories are available that attach to the bars and are adapted to carry irregular shaped luggage such as skis, bicycles, boats, and other such recreational equipment. With the known noise reducing devices attached to the bars, it is likely that the carrying accessories will no longer adapt to fit the bar properly. If the carrying accessories will not adapt to the bar and noise reducing device, then it would be desirable to be able to remove the noise reducing device in such a way that it could be replaced once the carrying accessory is removed from the load-carrying bar.

Another possible problem with known devices is that they don't adapt well to all of the existing shapes of bars. For example, the adhesive device may not adhere well where the bar has an irregular surface or a surface radiused such that the device cannot conform to the radiused surface and mate with sufficient surface area for the adhesive to be effective. Similarly, the known device that slides into a channel in the bar requires that the bar already have a channel with a cross section that mates with the device. If the bar and device do not mate, the noise-reducing device can not be secured to the bar as intended.

SUMMARY OF THE INVENTION

Accordingly, an aspect of the present invention is to provide an apparatus for reducing or silencing wind noise from vehicle luggage racks, where the apparatus may be repeatedly installed and removed.

In accordance with this aspect, a removable noise-reducing cover is provided where the cover has an elongated main body with at least one noise reducer integral to the surface of the body. The body is adapted for repeated removable attachment to a luggage rack bar.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

FIG. 1 is a perspective view of the removable cover;

FIG. 2 is a cross sectional view of the removable cover in position on a luggage rack bar;

DETAILED DESCRIPTION OF THE INVENTION

Turning now to FIG. 1, a removable cover 10 is shown for a vehicle luggage rack bar 110. The removable cover 10 has a main body portion with a lower surface 40 shaped to generally conform to the mating portion of the bar surface 120. The upper surface 50 of the removable cover 10 is adorned with noise reducers 60 arranged to reduce consistent wake-shedding propagation of airflow passing over the cover 10. As shown, the noise reducers 60 are elongated bumps arranged parallel with a longitudinal axis of the removable cover 10. The noise reducers 60 may also have a number of other shapes, such as a scalloped region, a sinusoid, and so forth. Also, the noise reducers 60 may be arranged in a pattern other than parallel to the longitudinal axis of the removable cover 10. For example, the noise reducers 60 may be arranged in a herringbone pattern, a diagonal pattern, or any other pattern. Patterns are generally chosen to complement the aesthetic attributes of the vehicle to which the luggage rack bar 110 is attached.

In an alternative embodiment, the dimensions of the noise reducers 60 may be chosen to satisfy certain safety requirements promulgated by the government where the removable cover is to be sold. For example, some jurisdictions establish a minimum radius for curved surfaces on the exterior of a vehicle with the goal of reducing injury to pedestrians in vehicle/pedestrian collisions. In one such jurisdiction, the legislated requirement may be satisfied by choosing a noise reducer 60 of an elongated bump having a radius of 4 mm.

In yet another alternative embodiment, the noise reducers 60 may also be made integral to the stanchions (not shown) supporting each bar 110.

In yet a further alternative embodiment, the noise reducers 60 may be adhered to the upper surface 50 with adhesive cement or film.

The removable cover 10 attaches to the bar 110 with a friction fit. To attach the removable cover 10 to the bar 110, the lower surface 40 of first edge 20 is placed into contact with the bar edge 160. It is desirable that the removable cover 10 be centered across the length of the bar 110. Once the lower surface 40 of the first edge 20 is in contact with the bar edge 160 and the removable cover 10 is centered across the bar 110, the removable cover 10 is rotated about the longitudinal axis of the first edge 20 until the opposing edge 30 of the removable cover is in contact with the opposing bar edge 150. Once the opposing edge 30 is in contact the opposing bar edge 150 a closure force is applied such that the opposing edge 30 temporarily deforms and ultimately snaps around the opposing bar edge 150, thereby retaining the removable cover 10 in position on the bar 110. Removal of the removable cover 10 from the bar 110 is achieved by reversing the steps taken to attach the removable cover 10 to the bar 110.

The removable cover 10 must be made from a sufficiently flexible material in order to perform the mentioned attaching and removing steps. The material used must also satisfy other design criteria to provide an attractive finished surface or, alternatively, provide a base compatible with a finishing layer or layers of paint or other coatings, such as composite veneers. In one embodiment of the invention the material used was a Thermal Plastic Olefin (TPO) commercially available as SOLVAY 1733.

FIG. 2 shows a cross section of the removable cover 10 in position on the bar 110. This cross section shows in detail the fitting relationship between the first retaining lip 140 and the bar edge 160, and also between the opposing retaining lip 130 and the opposing bar edge 150.

As depicted in FIG. 2 the lower surface 40 may be contoured to mate with the surface contours of the bar surface 120. These mating contours minimize the space between the surfaces 40, 120 thereby minimizing the opportunity to accumulate water, ice, and debris between the surfaces 40, 120.

Since luggage racks generally have two adjustable bars 110, it is desirable to attach one removable cover 10 to each bar. As can be seen from FIG. 1, the mating edge 100 of the mating cover 10' comes into close proximity, or may even touch, the opposing edge 30 of the removable cover 10 when the bars with mating covers 10, 10' are moved towards one another as shown by arrows A—A. This close proximity of the edges 30, 100 effectively closes the space defined by these two edges thereby providing an aesthetically pleasing appearance of the mated covers 10, 10'. The close proximity of the edges 30, 100 also effectively seals the space defined by the edges 30, 100 such that airflow through the space is limited, thereby reducing the possibility of developing a wind whistle in the space between the two edges 30, 100.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A removable noise-reducing cover for a luggage rack bar, said cover comprising:

an elongated main body portion having an upper surface and a lower surface, a first edge and an opposing edge formed in said upper surface, wherein said opposing edge is parallel to said first edge;

a retaining lip and an opposing retaining lip formed in said lower surface, wherein said retaining lip is parallel to said opposing retaining lip and said first edge; and said said lower and upper surfaces, and said first and opposing edges being shaped to generally conform to the luggage rack bar; and at least one noise reducer integral to said upper surface, wherein said main body portion is removable and reattachabie to the luggage rack bar.

2. The removable noise-reducing cover of claim 1, wherein said at least one noise reducer has a shape chosen from an elongated bump and a scallop.

3. The removable noise-reducing cover of claim 1 having a plurality of noise reducers arranged in a herringbone pattern.

4., The removable noise-reducing cover of claim 1 wherein a radius of the at least one noise reducer is at least four millimeters.

5. The removable noise-reducing cover of claim 1 wherein said main body portion is made of plastic.

6. The removable noise-reducing cover of claim 5 wherein said plastic is a thermal plastic olefin.

7. For a luggage rack having at least two adjustable luggage rack bars in parallel spaced relationship to each other, a removable noise-reducing bar cover comprising:

an elongated main body portion having an upper surface and a lower surface, said elongated main body portion having a first edge and an opposing edge formed in said upper surface, wherein said opposing edge is parallel to said first edge, said elongated main body portion further having a retaining lip and an opposing retaining lip formed in said lower surface, wherein said retaining lip is parallel to said opposing retaining lip and said first edge;

said opposing edge being adapted to mate with a mating edge of another noise-reducing bar cover;

said lower and upper surfaces being shaped to generally conform to the luggage rack bar;

at least one noise reducer integral to said upper surface; and said main body portion being adapted for repeated removable attachment to the luggage rack.

8. The removable noise-reducing cover of claim 7, wherein said at least one noise reducer has a shape chosen from an elongated bump and a scallop.

9. The removable noise-reducing cover of claim 7 wherein the at least one noise reducer comprises a plurality of noise reducers arranged in a herringbone pattern.

10. The removable noise-reducing cover of claim 7 wherein a radius of said noise reducer is at least four millimeters.

11. The removable noise-reducing cover of claim 7 wherein said main body portion is made of plastic.

12. The removable noise-reducing cover of claim 11 wherein said plastic is a thermal plastic olefin.

* * * * *